United States Patent [19]

Miller

[11] 3,960,301

[45] June 1, 1976

[54] BOAT TRANSPORT ANCHORING MEANS

[76] Inventor: Thomas J. Miller, 800 Lombard Ave., Evansville, Ind. 47715

[22] Filed: Nov. 18, 1974

[21] Appl. No.: 524,886

Related U.S. Application Data

[62] Division of Ser. No. 365,709, May 31, 1973.

[52] U.S. Cl. ................ 224/42.1 R; 224/42.1 E; 105/469; 105/473; 280/179 R
[51] Int. Cl.² .......................................... B60R 9/08
[58] Field of Search ............... 224/42.1 E, 42.1 R, 224/42.1 B, 29 R, 42.1 G; 105/469, 473, 477; 294/67 BA; 280/179 R, 414 R, 179 A; 254/161

[56] References Cited
UNITED STATES PATENTS

| | | | |
|---|---|---|---|
| 2,539,997 | 1/1951 | Graves | 105/469 X |
| 2,978,257 | 4/1961 | Barker | 280/179 A X |
| 3,128,516 | 4/1964 | Halvarson | 105/469 X |

Primary Examiner—Robert J. Spar
Assistant Examiner—Jerold M. Forsberg
Attorney, Agent, or Firm—Wilfred G. Caldwell

[57] ABSTRACT

The present disclosure is directed to an anchoring device for retaining a boat on top of an automobile either directly on the top or secured to a previously installed car top carrier. The device consists of a plurality of units each of which has a car top securing means and a boat securing means connected by a turnbuckle therebetween to control the tension. The structure of the present disclosure permits the boat to be transported in either the upright or inverted position.

3 Claims, 6 Drawing Figures

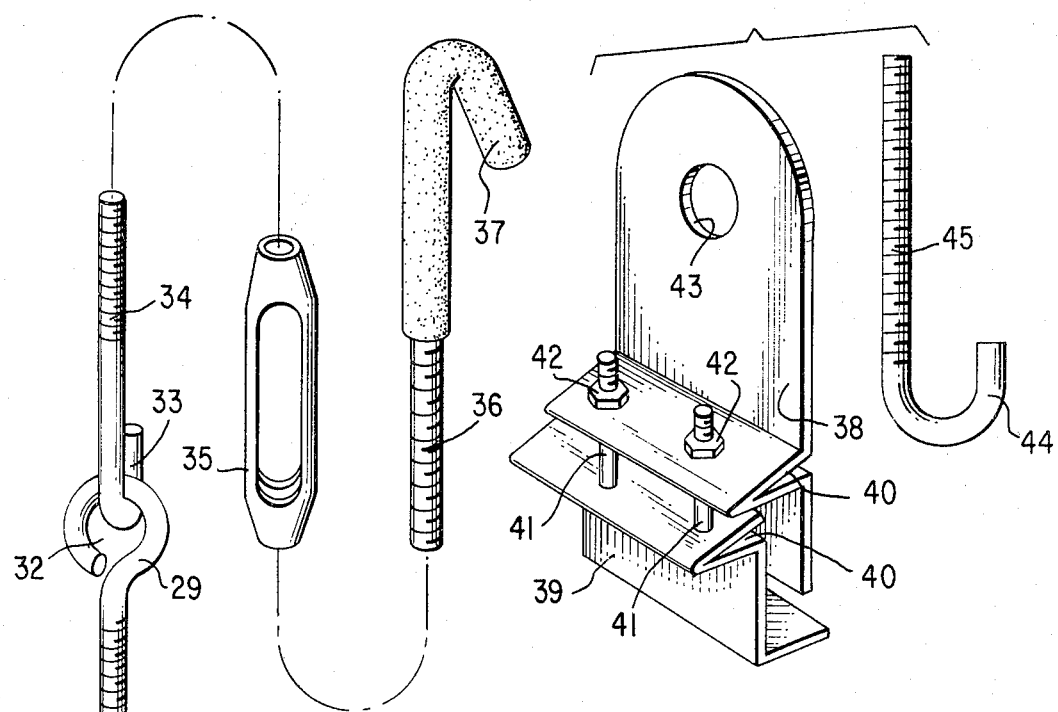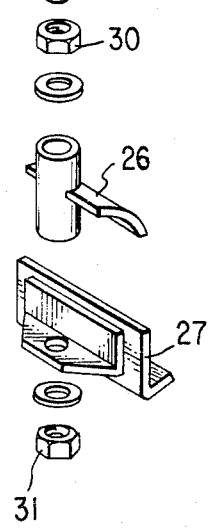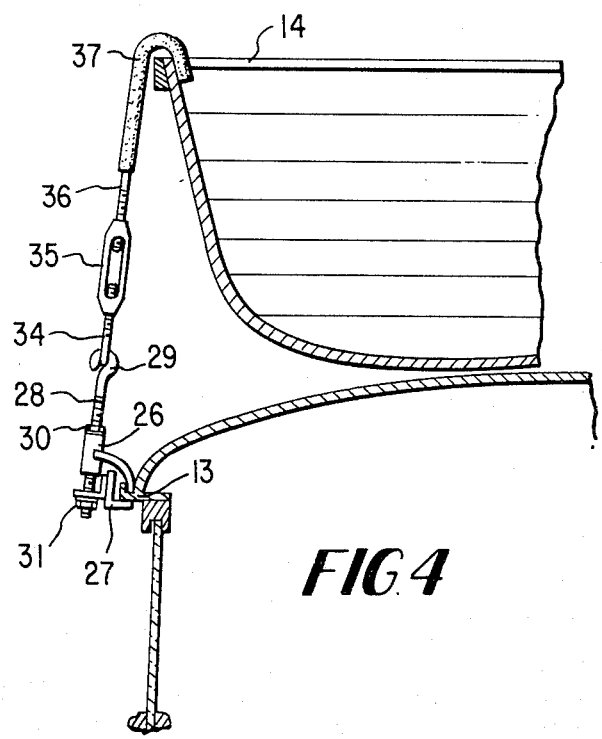

BOAT TRANSPORT ANCHORING MEANS

This is a division of application Ser. No. 365,709, filed May 31, 1973.

An object of the present invention is to provide a boat anchoring device which may be secured at one end either directly to the vehicle top or a car top carrier and secured at its other end to the boat or boat restraining strap when the boat is being transported in an inverted condition.

Another object of the present invention is the provision of an anchoring device having two tension adjustable jaws for positive engagement with the rain gutters which run along each side of the top of the vehicle.

A further object of the invention is the provision of an adjustable strap having a steel buckle with locking teeth which provides adjustment according to boat size which strap is secured to a hook at one end of a turnbuckle and a jawed clamp at the other end of the turnbuckle.

With the foregoing and other objects in view the invention will be more fully described hereinafter and more particularly pointed out in the appended claims.

In the drawings in which like parts are denoted by reference characters throughout the several views:

FIG. 4 is a fragmentary vertical transverse section taken through a modified form of anchoring device employed when transporting a boat in an upright condition.

FIG. 5 is an exploded perspective view taken at an enlarged scale of the anchoring device of FIG. 4.

FIG. 6 is a perspective view of a modified form of rain gutter clamping device employed with the present invention.

Figure 1:
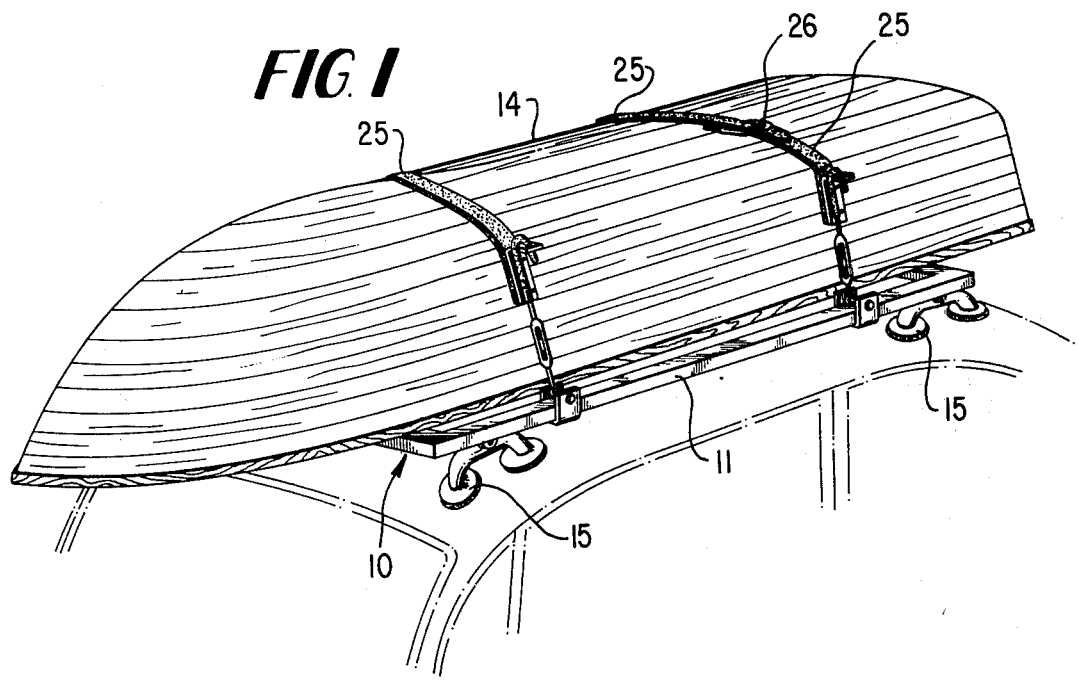
FIG. 1 is a perspective view of a boat in an inverted position upon a car top transport rack retained in place by the present invention.

Referring now to the drawings the problem confronting the inventor herein is the transporting of a boat in either the inverted position of FIG. 1 or the upright position of FIG. 4 and either upon a car top carrier 10 having longitudinal runners 11 or as in FIG. 4 directly upon the car top 12.

The car top has rain gutters 13 which run along the top at each side of the vehicle.

Figure 2:
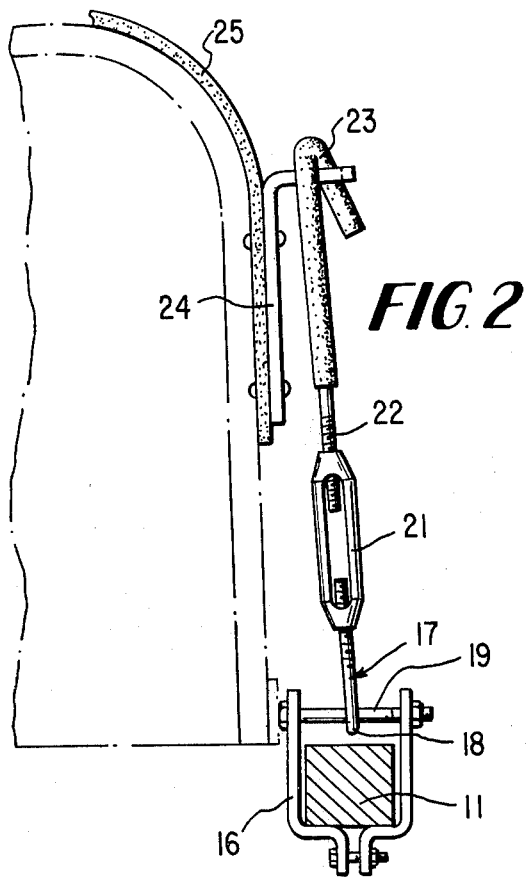
FIG. 2 is a fragmentary vertical transverse section taken through the anchoring device in the embodiment of FIG. 1.
Figure 3:
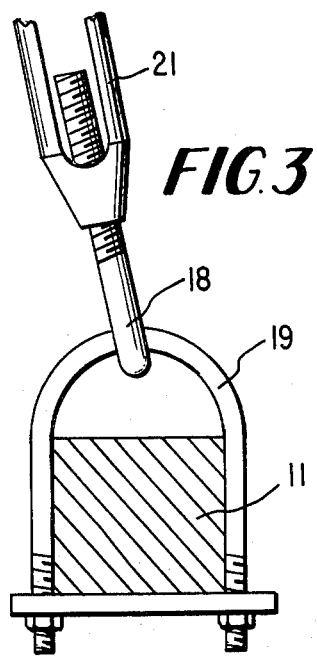
FIG. 3 is a vertical sectional view of a modified form of car top carrier anchoring device.

Referring now to FIG. 1, a boat 14 is placed in an inverted condition upon the car top carrier 10, which carrier is carried upon suction cup mounts 15 and retained by conventional turnbuckles, straps and hooks of the type shown in U.S. Pat. No. 2,589,772. As best seen in FIG. 2, a bolted shackle 16 is bolted about the runners 11. An eye bolt 17 having an eye 18 passes about bolt 19 of the shackle 16. The shank 20 of the eye bolt 17 is threaded to matingly engage one end of a turnbuckle 21. The other end of turnbuckle 21 threadingly receives the threaded shank 22 of an anchoring hook 23 the reverse turn of which passes through an opening in an attaching bracket 24 which is secured to one end of a restraining strap 25, there being two such straps at each anchor point joined by a steel buckle 26 having locking teeth. In the embodiment shown in FIGS. 1 through 3, the boat 14 is placed in the inverted condition upon the rack 10 and the straps 25 secured firmly against the boat which makes a firm rough adjustment for retaining the boat on the rack. A firm vernier adjustment to assure tight engagement of the boat against the rack is then attained by rotating the turnbuckle 21.

Referring now to FIGS. 4 and 5, a modified form of anchoring device is shown in which a two jaw adjustable clamp 26, 27 clamps about the rain gutters 13. These jaws 26, 27 are retained on a threaded shank 28 of a hook 29 by threaded nuts 30, 31. The eye 32 of the hook 29 is engaged by a hook 33 having a threaded shank 34 which mates with one end of a turnbuckle 35, the other end of which threadedly receives a shank 36 of a hook 37 which as best seen in FIG. 4, seats over the gunwale of the boat 14.

As best seen in FIG. 6, a modified form of clamp for locking to the rain gutters 13 is shown as being a two-piece plate structure 38, 39 having resilient folds 40 which are mated and compressed by bolts 41 and nuts 42 to cause the structure to lock about the rain gutter 13. The plate 38 has an opening 43 to receive the hook 44 of a threaded shank 45 which mates with a turnbuckle.

While I have used the word boat I intend this to cover canoes or other watercraft as well as luggage or luggage transport containers.

What I claim is:

1. For use with a boat supporting car top rack, a boat transport anchoring device comprising
   a. at least a pair of anchoring means secured along the car top rack at opposed positions,
   b. a threaded shank secured to each of said anchoring means,
   c. a pair of hooks each having a threaded shank,
   d. a pair of turnbuckle means, each turnbuckle receiving the threaded shanks of one of the hooks and one of the anchoring means,
   e. a strip of belting long enough to extend around the bottom of a boat to be gripped,
   f. a right angled pressure bracket affixed adjacent each of the ends of the belting with the upper portion of each bracket being angled outwardly of the boat and apertured for receiving said hooks respectively, whereby tensioning of the device by tightening said turnbuckle means, when the hooks are engaged, causes the belting to tighten and the pressure brackets to hug the boat thereby preventing slippage of the boat relative to the carrier.

2. A boat transport anchoring device as claimed in claim 1 wherein said strip of belting comprises,
   g. an adjustable two-piece anchor strap and buckle for making course adjustments of the belting to the boat.

3. For use with a car top carrier supporting a boat upside down thereon, a boat transport anchoring device comprising,
   a. at least one adjustable belting for extending around the bottom of the boat,
   b. right angled brackets connected at spaced apart locations along the belting, each having a long reach oriented vertically of the boat and a short reach extending outwardly of the belting with each short reach being apertured for receiving an engaging means to permit pressure application downwardly to force the belting and brackets tightly against the boat,
   c. means for gripping the car top carrier on opposite sides of the boat, d. a pair of adjustable means,
e. an eyebolt extending from each of the means for gripping to the associated adjustable means, and
f. a hook engaging each apertured reach and extending to each of the adjustable means whereby tightening of the adjustable means causes the belting and brackets to increase the holding force applied to said boat.

* * * * *